(12) United States Patent
Wright et al.

(10) Patent No.: US 12,206,950 B2
(45) Date of Patent: *Jan. 21, 2025

(54) COORDINATED PRIMARY MEDIA STREAM WITH SUPPLEMENTAL MEDIA STREAM

(71) Applicant: Charter Communications Operating, LLC, St. Louis, MO (US)

(72) Inventors: Ethan Wright, Denver, CO (US); Omar Alami, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,110

(22) Filed: Apr. 19, 2023

(65) Prior Publication Data

US 2023/0254543 A1 Aug. 10, 2023

Related U.S. Application Data

(63) Continuation of application No. 17/349,493, filed on Jun. 16, 2021, now Pat. No. 11,671,671.

(51) Int. Cl.
| | |
|---|---|
| *H04N 21/478* | (2011.01) |
| *H04L 51/52* | (2022.01) |
| *H04L 67/63* | (2022.01) |
| *H04N 21/2187* | (2011.01) |
| *H04N 21/234* | (2011.01) |
| *H04N 21/43* | (2011.01) |
| *H04N 21/454* | (2011.01) |
| *H04N 21/475* | (2011.01) |

(52) U.S. Cl.
CPC ........... *H04N 21/478* (2013.01); *H04L 51/52* (2022.05); *H04L 67/63* (2022.05); *H04N 21/2187* (2013.01); *H04N 21/23424* (2013.01); *H04N 21/4307* (2013.01); *H04N 21/43079* (2020.08); *H04N 21/454* (2013.01); *H04N 21/4753* (2013.01)

(58) Field of Classification Search
CPC ........... H04N 21/478; H04N 21/43079; H04N 21/2187; H04N 21/23424; H04N 21/4307; H04N 21/454; H04N 21/4753; H04L 67/63; H04L 51/52
USPC ............................................ 725/32; 709/229
See application file for complete search history.

(56) References Cited

U.S. PATENT DOCUMENTS

| | | | |
|---|---|---|---|
| 11,014,011 B2 | 5/2021 | Payzer et al. | |
| 11,350,138 B2 | 5/2022 | Richman et al. | |
| 2019/0260824 A1 | 8/2019 | Pitio et al. | |
| 2021/0168416 A1* | 6/2021 | Weiner | H04N 21/235 |
| 2021/0185381 A1 | 6/2021 | Clift | |

(Continued)

OTHER PUBLICATIONS

Notice of Allowance and Fees Due and Notice of Allowability for U.S. Appl. No. 17/349,493, dated Jan. 26, 2023, 8 pages.

*Primary Examiner* — Frantz B Jean
(74) *Attorney, Agent, or Firm* — Dority & Manning, P.A.

(57) ABSTRACT

A request, from an end user device associated with a user, for supplemental media is received. Based on the request, metadata and a broadcast time associated with a primary media stream transmitted to the end user device is determined. Based on the metadata and the broadcast time, supplemental media from an account of the user on a platform is retrieved. A supplemental media stream, that includes the supplemental media, is sent in synchronization with the primary media stream.

20 Claims, 13 Drawing Sheets

(56) References Cited

U.S. PATENT DOCUMENTS

| | | | |
|---|---|---|---|
| 2021/0368215 A1* | 11/2021 | Richman | H04N 21/21805 |
| 2021/0383439 A1* | 12/2021 | Edamadaka | H04L 67/55 |
| 2022/0256253 A1* | 8/2022 | Lazar | H04N 21/2187 |
| 2022/0337898 A1* | 10/2022 | Dorogusker | H04N 21/47815 |
| 2022/0408120 A1* | 12/2022 | Lazar | H04N 21/234309 |

* cited by examiner

COORDINATED PRIMARY MEDIA STREAM WITH SUPPLEMENTAL MEDIA STREAM

RELATED APPLICATION

This application is a continuation of U.S. patent application Ser. No. 17/349,493, filed on Jun. 16, 2021, entitled "COORDINATED PRIMARY MEDIA STREAM WITH AGGREGATE SUPPLEMENTAL MEDIA STREAM," U.S. Pat. No. 11,671,671 B2, which is hereby incorporated herein by reference in its entirety.

BACKGROUND

Users increasingly watch a broadcast while participating or consuming supplemental media. For example, users may watch a broadcast on their television while also consuming content related to that broadcast on other platforms, such as social media.

SUMMARY

The embodiments disclosed herein provide a coordinated primary media stream with an aggregate supplemental media stream. In particular, the embodiments provide a routing system that determines metadata and a broadcast time associated with a primary media stream watched on an end user device by a user. Using authentication credentials provided by the user, the routing system retrieves supplemental media from a plurality of different platforms based on the metadata and the broadcast time of the primary media stream. These platforms include, for example, social media platforms, news platforms, chat platforms, or the like. The routing system merges the supplemental media into an aggregate supplemental media stream and sends the aggregate supplemental media stream to the same, or different, end user device of the user. The user can watch the primary media stream while simultaneously engaging multiple platforms.

In one embodiment, a method is provided. The method includes receiving, by a computing device that includes a processor device, a request, from an end user device associated with a user, for supplemental media. The method further includes determining, by the computing device, based on the request, metadata and a broadcast time associated with a primary media stream transmitted to the end user device. The method further includes retrieving, by the computing device, based on the metadata and the broadcast time, supplemental media from an account of the user on a platform, and sending, by the computing device to the end user device, a supplemental media stream that includes the supplemental media in synchronization with the primary media stream.

In another embodiment, a computing system is provided. The computing system includes a memory and a processor device set that includes one or more processor devices coupled to the memory. The processor device set is to receive a request, from an end user device associated with a user, for supplemental media. The processor device set is further to determine, based on the request, metadata and a broadcast time associated with a primary media stream transmitted to the end user device. The processor device set is further to retrieve, based on the metadata and the broadcast time, supplemental media from a account of the user on a platform, and send, to the end user device, a supplemental media stream that includes the supplemental media in synchronization with the primary media stream.

In another embodiment, a computer program product is provided. The computer program product is stored on a non-transitory computer-readable storage medium and includes instructions to cause a processor device set that includes one or more processor devices to receive a request, from an end user device associated with a user, for supplemental media. The instructions are further to cause the processor device set to determine, based on the request, metadata and a broadcast time associated with a primary media stream transmitted to the end user device. The instructions are further to cause the processor device set to retrieve, based on the metadata and the broadcast time, supplemental media from a account of the user on a platform, and send, to the end user device, a supplemental media stream that includes the supplemental media in synchronization with the primary media stream.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. For example, the recitation of A or B means A, or B, or both A and B.

Users increasingly watch a broadcast while participating or consuming supplemental media. For example, users may watch a broadcast on their television while also consuming content related to that broadcast on other platforms, such as social media. However, doing so can be difficult and cumbersome for users who want to watch the broadcast and simultaneously engage multiple platforms.

The examples disclosed herein provide a coordinated primary media stream with an aggregate supplemental media stream. In particular, the embodiments provide a routing system that determines metadata and a broadcast time associated with a primary media stream watched on an end user device by a user. Using authentication credentials provided by the user, the routing system retrieves supplemental media from a plurality of different platforms based on the metadata and the broadcast time of the primary media stream. These platforms include, for example, social media platforms, news platforms, chat platforms, or the like. The routing system merges the supplemental media into an aggregate supplemental media stream and sends the aggregate supplemental media stream to the same or different end user device of the user. The user can watch the primary media stream while simultaneously engaging with multiple platforms.

Figure 1A:
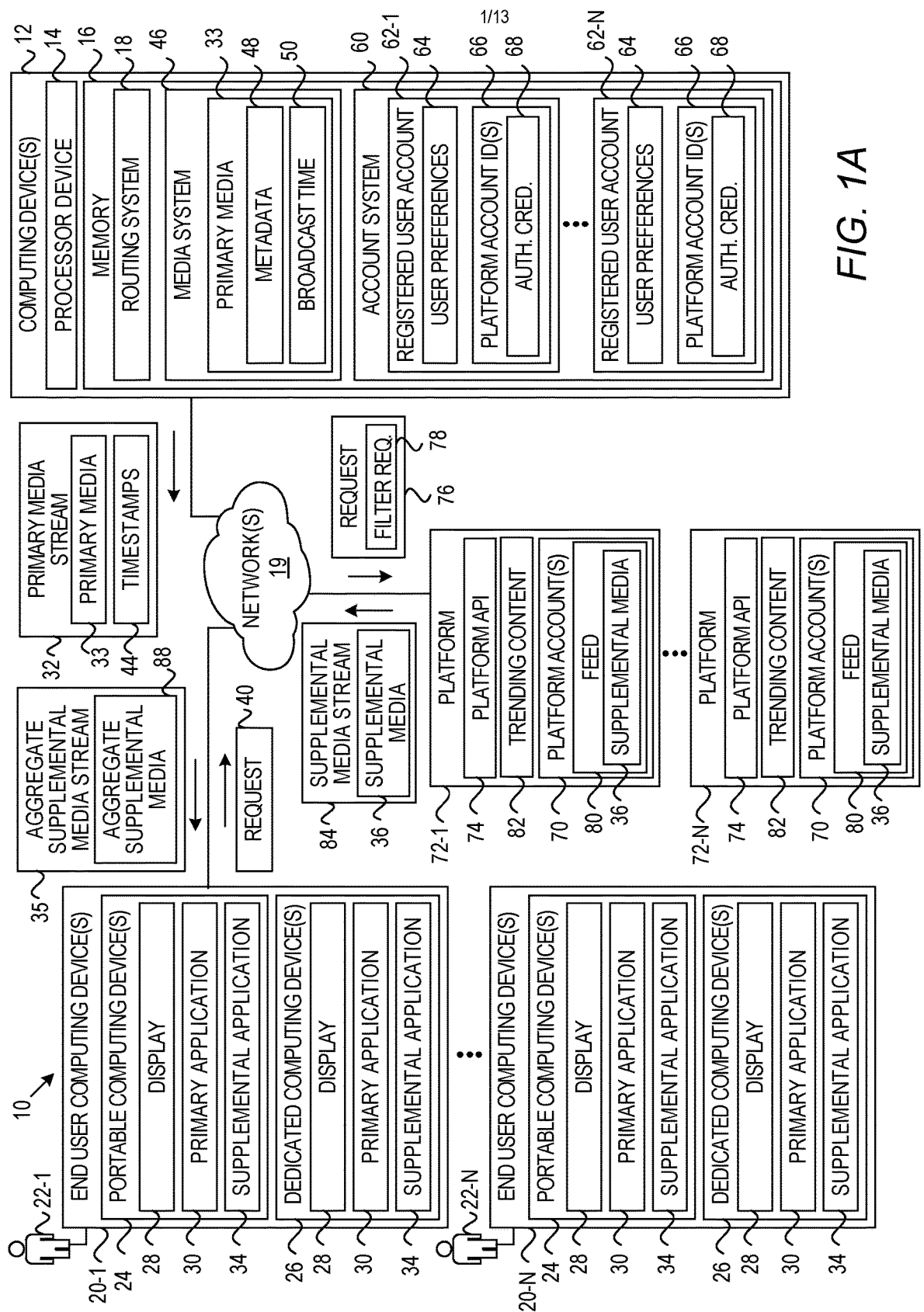
FIG. 1A is a block diagram of a system for coordinating a primary media stream with an aggregate supplemental media stream, illustrating certain aspects of various embodiments disclosed herein.

FIG. 1A is a block diagram of a system 10 for coordinating a primary media stream with an aggregate supplemental media stream, illustrating certain aspects of various embodiments disclosed herein. The system 10 includes a computing device 12 with a processor device 14 and a memory 16 coupled to the processor device 14. Although only the computing device 12 is illustrated with a processor device 14 and a memory 16, any component may include one or more processor devices 14 and/or a memory 16.

The computing device 12 further includes a routing system 18. Because the routing system 18 is a component of the computing device 12, functionality implemented by the routing system 18 may be attributed to the computing device 12. Moreover, in examples where the routing system 18 includes software instructions that program the processor device 14 to carry out functionality discussed herein, functionality implemented by the routing system 18, or any other system, may be attributed to the processor device 14.

It is further noted that while the routing system 18 is shown as a single component, in other implementations, the routing system 18 may be implemented in a greater number of components than two. Finally, it is noted that while, for purposes of illustration and simplicity, the embodiments are illustrated as being implemented by a processor device set that includes a single processor device on a single computing device, in other environments, such as a distributed and/or clustered environment, the embodiments may be implemented on a computing system that includes a processor device set that includes a plurality of processor devices of a plurality of different computing devices, and functionality of the embodiments may be implemented on different processor devices of different computing devices. Thus, irrespective of the implementation, the embodiments may be implemented on a computing system that includes a processor device set made up of one or more processor devices of one or more computing devices.

The routing system 18 is in communication over a network 19 with one or more end user computing devices 20-1-20-N (referred to generally as an end user computing device 20) associated with a user 22-1-22-N (referred to generally as user 22). In particular, each user 22 is associated with one or more of the end user computing devices 20-1. For example, each user may have one or more portable computing devices 24 and/or one or more dedicated computing devices 26. Portable computing devices 24 may include mobile devices, tablet computers, laptop computers, or the like. Dedicated computing devices 26 may include set-top boxes or the like. Each of the portable computing devices 24 and/or dedicated computing devices 26 may include or be communicatively coupled to a display 28, such as an internal display or an external display. For example, in certain embodiments, the dedicated computing device 26 may be a set-top box, and the display 28 may be a television.

Each of the portable computing devices 24 and/or dedicated computing devices 26 may include a primary application 30 configured to receive a primary media stream 32 of primary media 33. For example, the dedicated computing device 26 may be a set-top box configured to receive cable television broadcasts. A set-top box may also be referred to as a cable box or television decoder. The set-top box generally contains a TV-tuner input and display outputs to a television set to turn a source signal into content for display on the television set or other display device. Each of the portable computing devices 24 and/or dedicated computing devices 26 may further include a supplemental application 34 to receive an aggregate supplemental media stream 35 of supplemental media 36, as described in more detail below. Supplemental media 36 may include social media posts, chat posts, and/or news articles. For example, in certain embodiments, the social media posts are from Facebook, Twitter, Instagram, or the like. In certain embodiments, the chat posts are from a chat application. In certain embodiments, the news articles are from Google News, Yahoo News, or the like.

In certain embodiments, a user 22 is watching a primary media stream 32 through the primary application 30 of the end user computing device 20. Through the supplemental application 34 of the end user computing device 20, the user 22 may send a request 40 for an aggregate supplemental media stream 35 to the routing system 18. In certain embodiments, the supplemental application 34 is executed on the same end user computing device 20 as the primary application 30. For example, in certain embodiments, the user 22 watches the primary application 30 on a laptop and also accesses the supplemental application 34 through the laptop. In other embodiments, the supplemental application 34 is executed on a different end user computing device 20 than the primary application 30. For example, in certain embodiments, the user 22 watches the primary application 30 on a television through a set-top box and accesses the supplemental application 34 through a mobile device.

Upon receiving the request 40 for an aggregate supplemental media stream 35, the routing system 18 determines, based on the request 40, the primary media stream 32 being streamed to the end user computing device 20 and watched by the user 22. In certain embodiments, the primary media stream 32 includes the primary media 33 and may include timestamps 44. For example, in certain embodiments, the primary media 33 is a television broadcast, such as an episode of a cable television series. The primary media 33 may be transmitted to the end user computing device 20 by the routing system 18. In particular, the routing system 18 is in communication with a media system 46 that manages the primary media 33, where the primary media 33 has metadata 48 and a broadcast time 50. The end user computing device 20 requests the primary media 33 from the routing system 18. In other embodiments, the end user computing device 20 accesses the primary media 33 through a third-party system and transmits the metadata 48 to the routing system 18 to inform the routing system 18 as to the primary media 33. In either case, the routing system 18 determines metadata 48 and a broadcast time 50 associated with a primary media stream 32 of the primary media 33 transmitted to the end user computing device 20.

The routing system 18 is in communication with an account system 60 having a plurality of registered user accounts 62-1-62-N (referred to generally as registered user accounts 62), each associated with a different user 22. In particular, the user 22 registers with the account system 60 to receive the primary media 33. Each registered user account 62 includes user preferences 64 and platform account IDs 66 with authentication credentials 68. The user preferences 64 may include display preferences, streaming preferences, or the like. The platform account IDs 66 identify platform accounts 70 on platforms 72-1-72-N (referred to generally as platforms 72) associated with a user 22. The platform 72 may also be referred to herein as a platform 72. Each platform 72 may include a plurality of platform accounts 70, each associated with one of a plurality of users 22. The platforms 72 may include social media platforms, such as Twitter, Facebook, or the like. The platforms 72 may include news platforms, such as Google News. The platforms 72 may include chat platforms, such as instant messengers. The platforms 72 may include video platforms, such as YouTube, from which the routing system 18 retrieves videos and/or user comments about the videos. Authentication credentials 68 may include a username and/or password for accessing the platform account 70 on the platform 72. In certain embodiments, authentication credentials 68 may include tokens, such as to use OAuth 2.0 for data exchange. The user may enter a password once for the routing system 18 to access the platform 72, which would provide the routing system 18 with a token for data requests.

The routing system 18 accesses the account system 60 to retrieve the platform account ID 66 and authentication credentials 68 that correspond to a particular user 22 to gain access to the platform account 70 for each platform 72, such as through the platform application programming interface (API) 74 of the platform 72. The routing system 18 may send a request 76 with filter requirements 78 to each platform 72. Based on the metadata 48 and the broadcast time 50 of the primary media 33, the routing system 18 accesses each of a plurality of platforms 72 to retrieve supplemental media 36 from a feed 80 of the platform account 70 associated with a user 22 on the platform 72. In certain embodiments, the metadata 48 of the primary media 33 is determined based on trending content 82 on one or more of the platforms 72, such as for unscheduled live broadcasts. Trending content 82 refers to content related to a topic that experiences a surge in popularity on the platform 72 for a limited duration of time.

With the filter requirements 78, the routing system 18 retrieves only select supplemental media 36 from a feed 80 of supplemental media 36 so that only the supplemental media 36 related to the primary media 33 is retrieved. For example, for news coverage of a presidential election, the routing system 18 retrieves Tweets from a Twitter account of a user 22 that are related to the presidential election. In certain embodiments, through the platform API 74 of each platform 72, the routing system 18 opens a supplemental media stream 84 to continuously receive supplemental media 36 based on the filter requirements 78. In certain embodiments, the routing system 18 retrieves the feed 80 from the platform 72, and then the routing system 18 applies the filter requirements 78 to select only the supplemental media 36 related to the primary media 33.

Once the routing system 18 retrieves supplemental media 36 from each platform 72, consistent with user preferences 64, the routing system 18 merges the supplemental media 36 into an aggregate supplemental media stream 35 of aggregate supplemental media 88 and transmits the aggregate supplemental media stream 35 over the network 19 to the end user computing device 20 of the user 22 in synchronization with the primary media stream 32. The routing system 18 may use any number of platforms or other inputs for aggregation.

Accordingly, for example, if a user 22 is watching election coverage on the television, the user 22 can receive a continuous curated stream of related content aggregated from each of a plurality of platform accounts 70 on a mobile device of the user 22. Doing so prevents the user 22 from having to continuously cycle through each of these platforms 72 for updates related to the election coverage.

The end user computing device 20 may include an augmented reality device, head-mounted display, or the like. For an augmented reality device, the supplemental application 34 could display the aggregate supplemental media stream 35 such that the aggregate supplemental media stream 35 projects onto a side of the television of the user 22.

It is noted that in certain embodiments, the metadata 48 and/or aggregate supplemental media stream 35 is automatically updated if the end user computing device 20 requests a different primary media stream 32. For example, if the user 22 changes the channel on the television, the routing system 18 may automatically change the filter requirements 78 sent to the platforms 72 to thereby alter the aggregate supplemental media stream 35.

Figure 1B:
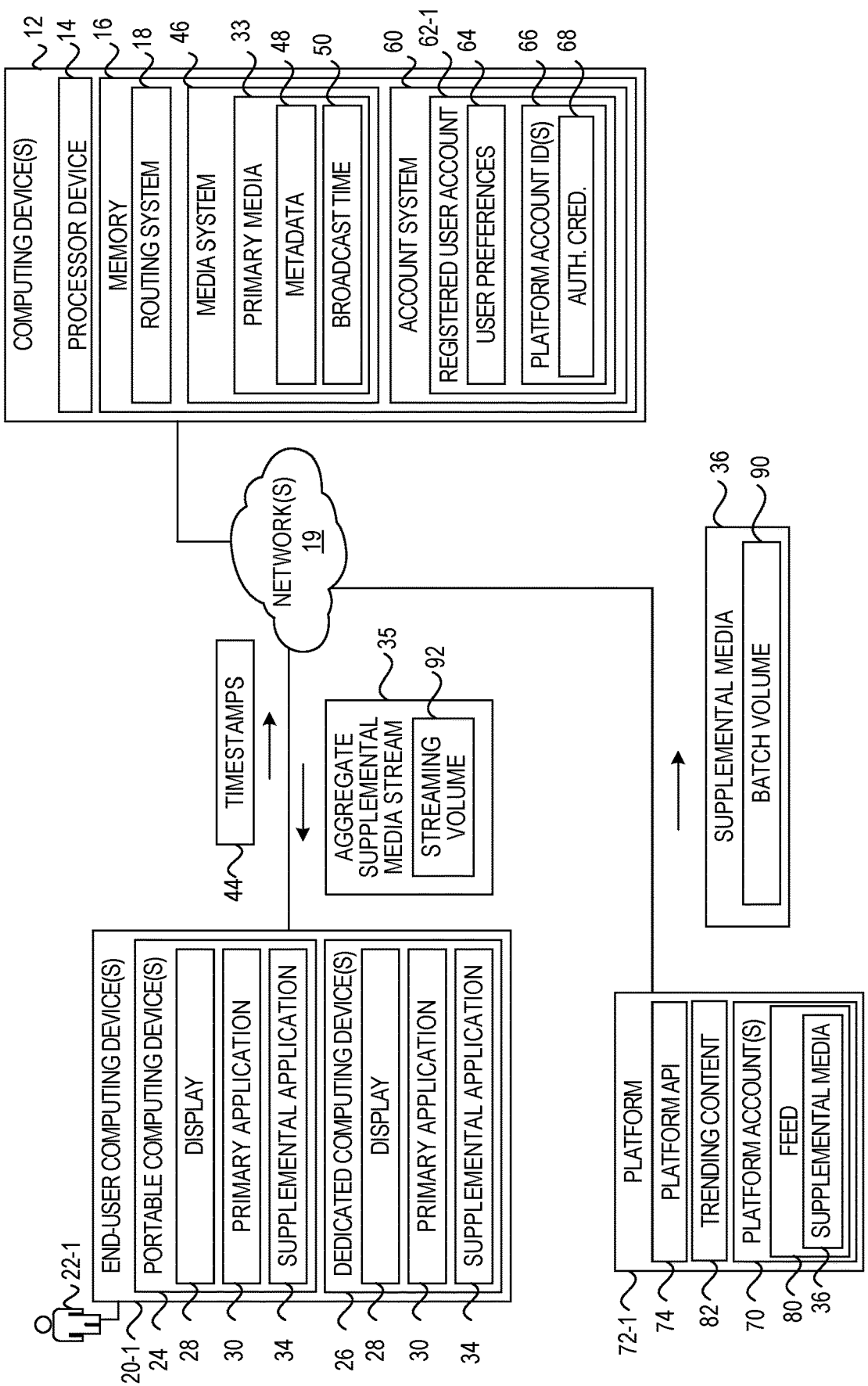
FIG. 1B is a block diagram of a system for coordinating a primary media stream with an aggregate supplemental media stream based on a historical broadcast time, illustrating certain aspects of various embodiments disclosed herein.

FIG. 1B is a block diagram of a system for coordinating a primary media stream 32 with an aggregate supplemental media stream 35 based on a historical broadcast time 50, illustrating certain aspects of various embodiments disclosed herein. In this embodiment, instead of watching a live broadcast, the user 22 may be watching a historical broadcast, such as an old television episode. In such circumstances, the routing system 18 retrieves supplemental media 36 in batch volumes 90 based on the historical broadcast time 50. For example, if the user 22 requests to watch an episode of Game of Thrones on June 30 when the episode originally aired on June 1 at 8:00 PM, then the routing system 18 retrieves supplemental media 36 from the platform 72 on June 1 between 8:00 PM and 9:00 PM in one large batch. The routing system 18 then streams the supplemental media 36 in smaller streaming volumes 92 depending on timestamps 44 of the primary media 33. For example, at the five-minute time stamp, the routing system 18 only transmits the supplemental media 36 that was posted around 8:00 PM in one second streaming volumes 92. In this way, as the user 22 watches the episode, the experience of watching the episode on its original air date is reproduced without providing any spoilers. Of course, other batch sizes, time stamps, or intervals could be used.

Figure 1C:
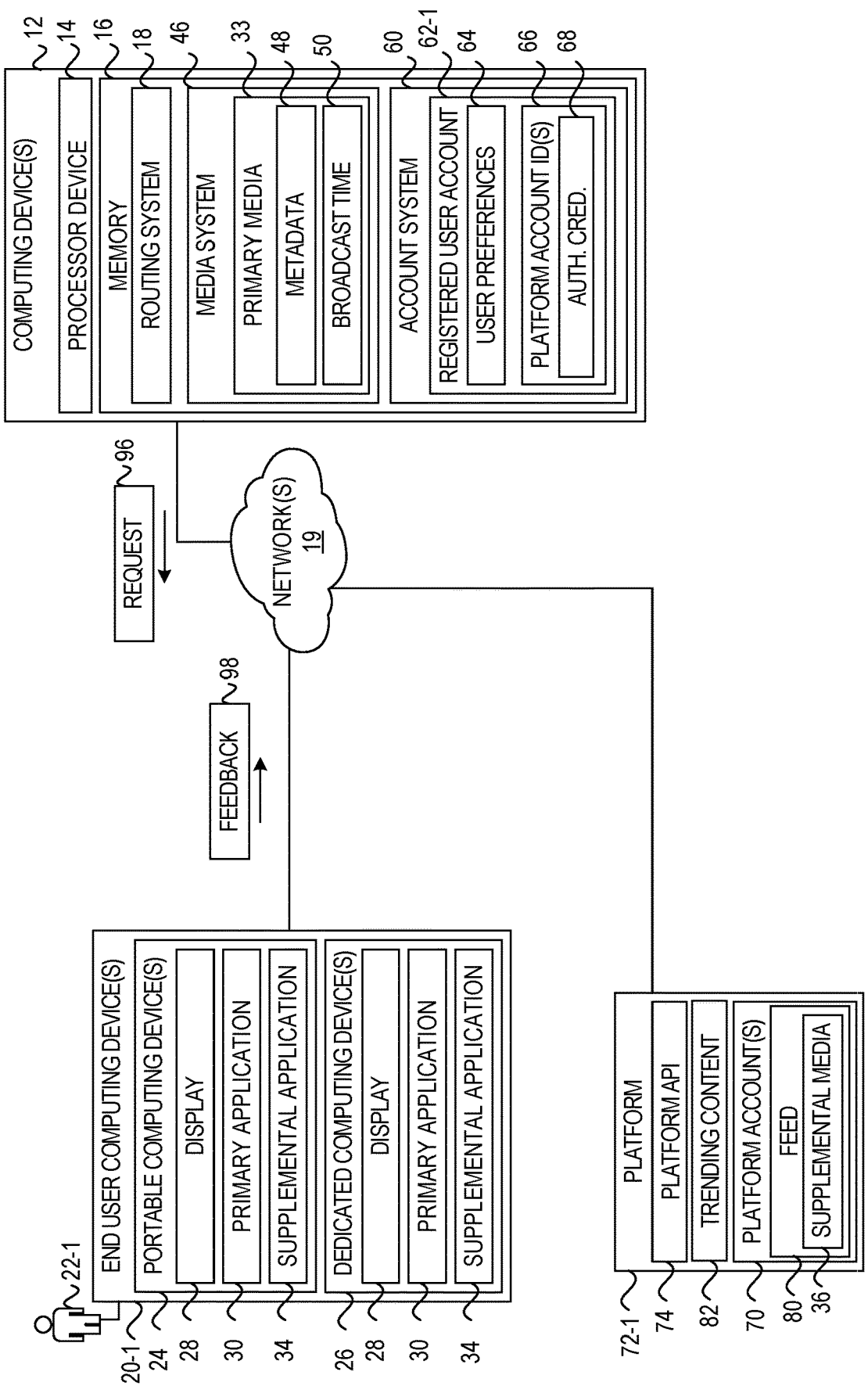
FIG. 1C is a block diagram of a system for coordinating a primary media stream with an aggregate supplemental media stream based on an unscheduled live broadcast time, illustrating certain aspects of various embodiments disclosed herein.

FIG. 1C is a block diagram of a system for coordinating a primary media stream 32 with an aggregate supplemental media stream 35 based on an unscheduled live broadcast time, illustrating certain aspects of various embodiments disclosed herein. In this embodiment, the live broadcast is an unscheduled live broadcast, and the routing system 18 is further configured to query the first platform 72 for trending content 82 to generate the metadata 48 associated with the unscheduled live broadcast. The routing system 18 is further configured to send a request 96 to the end user computing device 20 for the user 22 to confirm whether the first supplemental media 36 is related to the unscheduled live broadcast. The routing system 18 revises the metadata 48 of the primary media stream 32 based on feedback 98 of one or more users 22 to then revise the aggregate supplemental media stream 35. For example, for an unscheduled live broadcast related to an earthquake, the routing system 18 queries platforms 72 for trending content 82 and finds that a wildfire is trending. The routing system generates metadata 48 based on wildfires and requests supplemental media 36 from platforms 72 related to wildfires. The routing system 18 sends an aggregate supplemental media stream 35 based on wildfires. The routing system 18 receives feedback 98 from the user 22 that the supplemental media 36 is not relevant to the primary media stream 32 and that the primary media stream 32 is related to earthquakes. The routing system 18 revises the metadata 48 based on earthquakes and requests supplemental media 36 from platforms 72 related to earthquakes. The routing system 18 sends the revised aggregate supplemental media stream 35.

Figure 2:
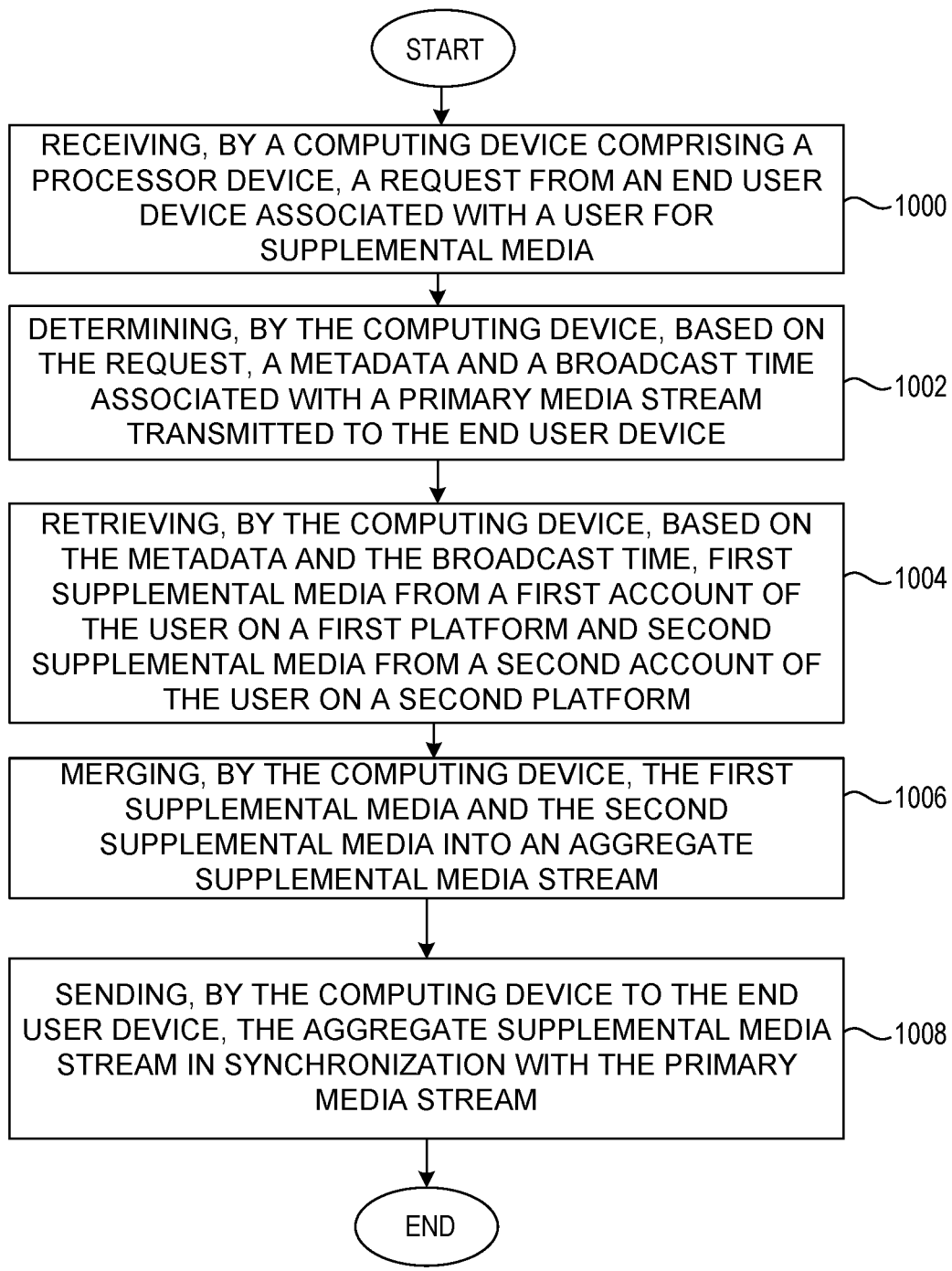
FIG. 2 is a flowchart illustrating processing steps for coordinating a primary media stream with an aggregate supplemental media stream.

FIG. 2 is a flowchart illustrating processing steps using the system of FIG. 1A. The computing device 12, with a processor device 14, receives a request 40 from an end user device 20 associated with a user 22 for supplemental media 36 (1000). The computing device 12 further determines a metadata 48 and a broadcast time 50 associated with a primary media stream 32 transmitted to the end user device 20 (1002). The computing device 12 further retrieves, based on the metadata 48 and the broadcast time 50, first supplemental media 36 from a first account 70 of the user 22 on a first platform 72 and second supplemental media 36 from a second account 70 of the user 22 on a second platform 72 (1004). The computing device 12 further merges the first supplemental media 36 and the second supplemental media 36 into an aggregate supplemental media stream 35 (1006). The computing device 12 further sends, to the end user device 20, the aggregate supplemental media stream 35 in synchronization with the primary media stream 32 (1008).

In certain embodiments, the computing device 12 is further configured to receive from the end user device 20, first authentication credentials 68 associated with the user 22 to gain access to the first account 70 of the first platform 72. The computing device 12 is further configured to receive from the end user device 20, second authentication credentials 68 associated with the user 22 to gain access to the second account 70 of the second platform 72. For each platform 72, the computing device 12 is further configured to utilize the authentication credentials 68 to access the first account 70 of the platform 72 to retrieve supplemental media 36 filtered from a feed 80 based on filter requirements 78. The filter requirements 78 include that the supplemental media 36 be related to the metadata 48 and restricted by the broadcast time 50.

In certain embodiments, the primary media stream 32 is a live broadcast. The broadcast time 50 associated with the primary media stream 32 is a live broadcast time. The computing device 12 is further configured to retrieve, based on the metadata 48 and the live broadcast time, first supplemental media 36 from a first account 70 of the user 22 on a first platform 72 and second supplemental media 36 from a second account 70 of the user 22 on a second platform 72.

In certain embodiments, the live broadcast is a scheduled live broadcast, and the computing device 12 is further configured to receive the metadata 48 associated with the scheduled live broadcast before the scheduled live broadcast. In certain embodiments, the live broadcast is an unscheduled live broadcast, and the computing device 12 is further configured to query the first platform 72 for trending content 82 to generate the metadata 48 associated with the unscheduled live broadcast. The computing device 12 is further configured to send a request 40 to the end user device 20 for the user 22 to confirm whether the first supplemental media 36 is related to the unscheduled live broadcast. The computing device 12 is further configured to revise the metadata 48 of the primary media stream 32 based on feedback of one or more users 22.

In certain embodiments, the primary media 33 is a historical broadcast, and the broadcast time associated with the primary media 33 is a historical broadcast time. The computing device 12 is further configured to retrieve, based on the metadata 48 and the historical broadcast time, first supplemental media 36 from a first account 70 of the user 22 on a first platform 72 and second supplemental media 36 from a second account 70 of the user 22 on a second platform 72. The computing device 12 is further configured to send to the end user device 20 of the user 22, the aggregate supplemental media stream 35 in synchronization with the primary media stream 32 based on timestamps 44 in the primary media stream 32. The computing device 12 is further configured to retrieve, based on the metadata 48 and the broadcast time 50, the first supplemental media 36 from the first account in a batch volume 90. The computing device 12 is further configured to send to the end user device 20 of the user 22, the aggregate supplemental media stream 35 incrementally in a streaming volume 92 in synchronization with the primary media stream 32, each streaming volume 92 less than the batch volume 90.

In certain embodiments, the computing device 12 is further configured to receive from the end user device 20 a request to continue receiving the first supplemental media 36 in the aggregate supplemental media stream 35 and to stop receiving the second supplemental media 36 in the aggregate supplemental media stream 35.

Figure 3A:
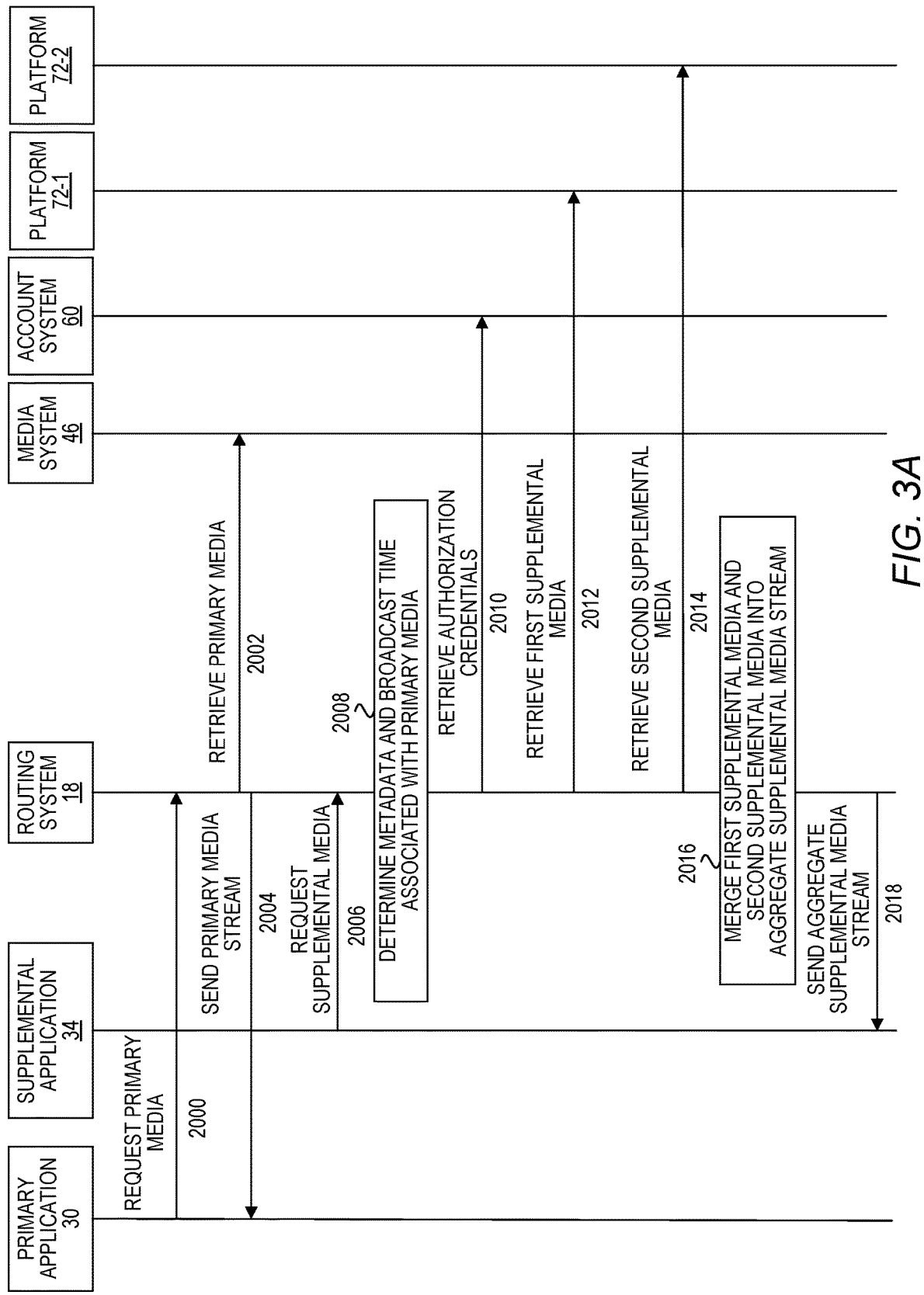
FIG. 3A is a message sequence diagram illustrating example messages communicated between and actions taken by several of the elements illustrated in FIGS. 1A-1C to send an aggregate supplemental media stream, according to one embodiment.

FIG. 3A is a message sequence diagram illustrating example messages communicated between and actions taken by several of the elements illustrated in FIGS. 1A-1C to send an aggregate supplemental media stream 35, according to one embodiment. The primary application 30 requests primary media 33 from the routing system 18 (2000). The routing system 18 retrieves primary media 33 from the media system 46 (2002). The routing system 18 sends a primary media stream 32 to the primary application 30 (2004). The supplemental application 34 requests supplemental media 36 from the routing system 18 (2006). The routing system 18 determines metadata 48 and a broadcast time 50 associated with the primary media 33 (2008). The routing system 18 retrieves authorization credentials 68 from the account system 60 (2010). Using the authorization credentials 68, the routing system 18 retrieves first supplemental media 36 from the first platform 72-1 (2012) and retrieves second supplemental media 36 from the second platform 72-2 (2014). The routing system 18 merges the first supplemental media 36 and the second supplemental media 36 into an aggregate supplemental media stream 35 (2016). Then the routing system 18 sends the aggregate supplemental media stream 35 to the supplemental application 34 (2018).

Figure 3B:
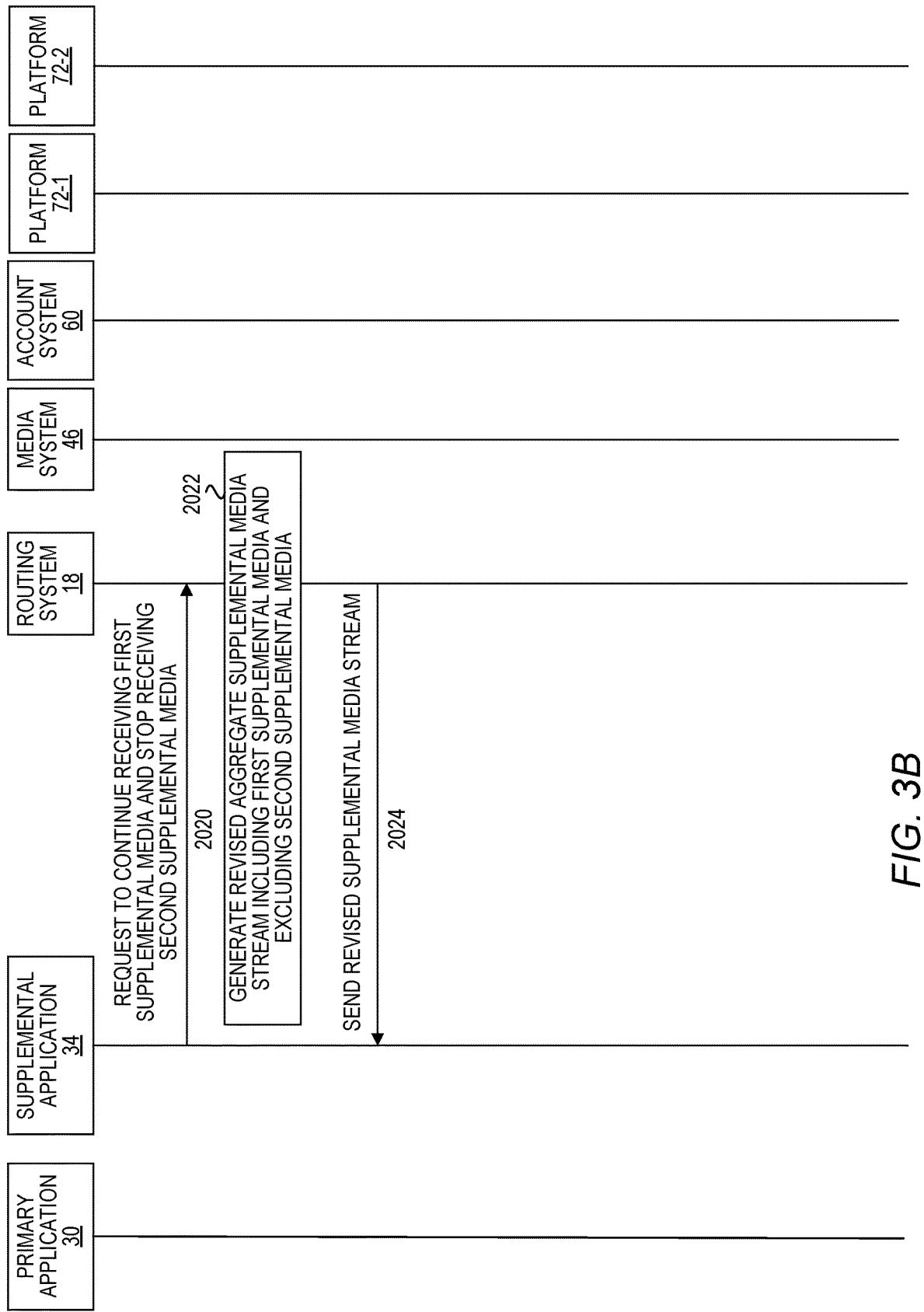
FIG. 3B is a message sequence diagram illustrating example messages communicated between and actions taken by several of the elements illustrated in FIGS. 1A-1C to send a revised aggregate supplemental media stream, according to one embodiment.

FIG. 3B is a message sequence diagram illustrating example messages communicated between and actions taken by several of the elements illustrated in FIGS. 1A-1C to send a revised aggregate supplemental media stream, according to one embodiment. The supplemental application 34 requests to continue receiving the first supplemental media 36 and stop receiving the second supplemental media 36 (2020). The routing system 18 generates a revised aggregate supplemental media stream 35 (2022) and sends the revised aggregate supplemental media stream 35 to the supplemental application 34 (2024).

Figure 4A:
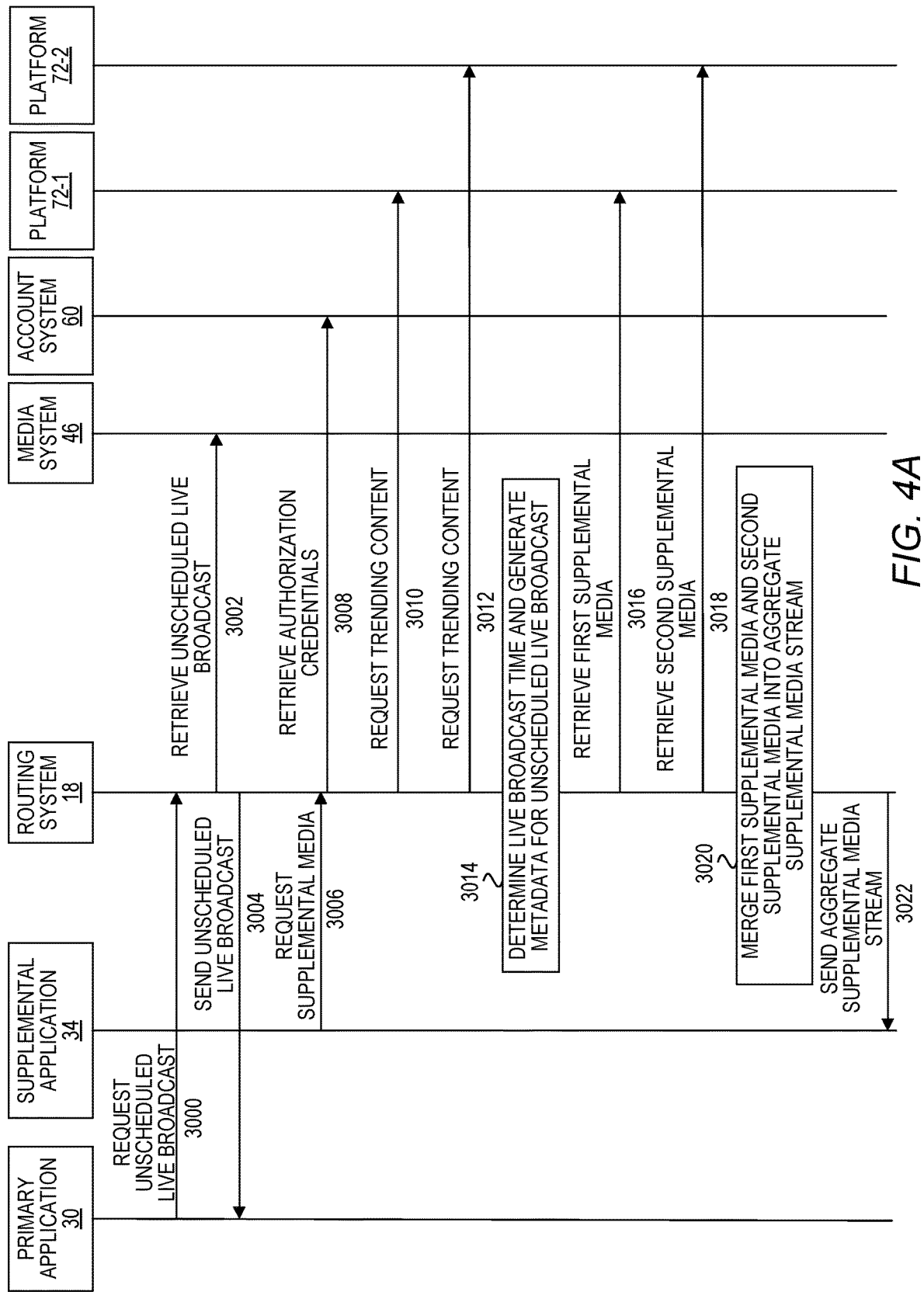
FIG. 4A is a message sequence diagram illustrating example messages communicated between and actions taken by several of the elements illustrated in FIGS. 1A-1C regarding sending an aggregate supplemental media stream for an unscheduled live broadcast, according to one embodiment.

FIG. 4A is a message sequence diagram illustrating example messages communicated between and actions taken by several of the elements illustrated in FIGS. 1A-1C regarding sending an aggregate supplemental media stream for an unscheduled live broadcast, according to one embodiment. The primary application 30 requests an unscheduled live broadcast from the routing system 18 (3000). The routing system 18 retrieves an unscheduled live broadcast from the media system 46 (3002). The routing system 18 sends the unscheduled live broadcast to the primary application (3004). The supplemental application 34 requests supplemental media 36 from the routing system 18 (3006). The routing system 18 retrieves authorization credentials 68 from the account system 60 that corresponds to the user 22 (3008). Using the authorization credentials 68, the routing system 18 requests trending content 82 from the first platform 72-1 (3010) and the second platform 72-2 (3012). The routing system 18 determines a live broadcast time and generates metadata 48 for the unscheduled live broadcast (3014). Based on the live broadcast time and the metadata 48, the routing system 18 retrieves first supplemental media 36 from the first platform 72-1 (3016) and retrieves second supplemental media 36 from the second platform 72-2 (3018). The routing system 18 merges the first supplemental media 36 and the second supplemental media 36 into an aggregate supplemental media stream 35 (3020) and sends the aggregate supplemental media stream 35 to the supplemental application 34 (3022).

Figure 4B:
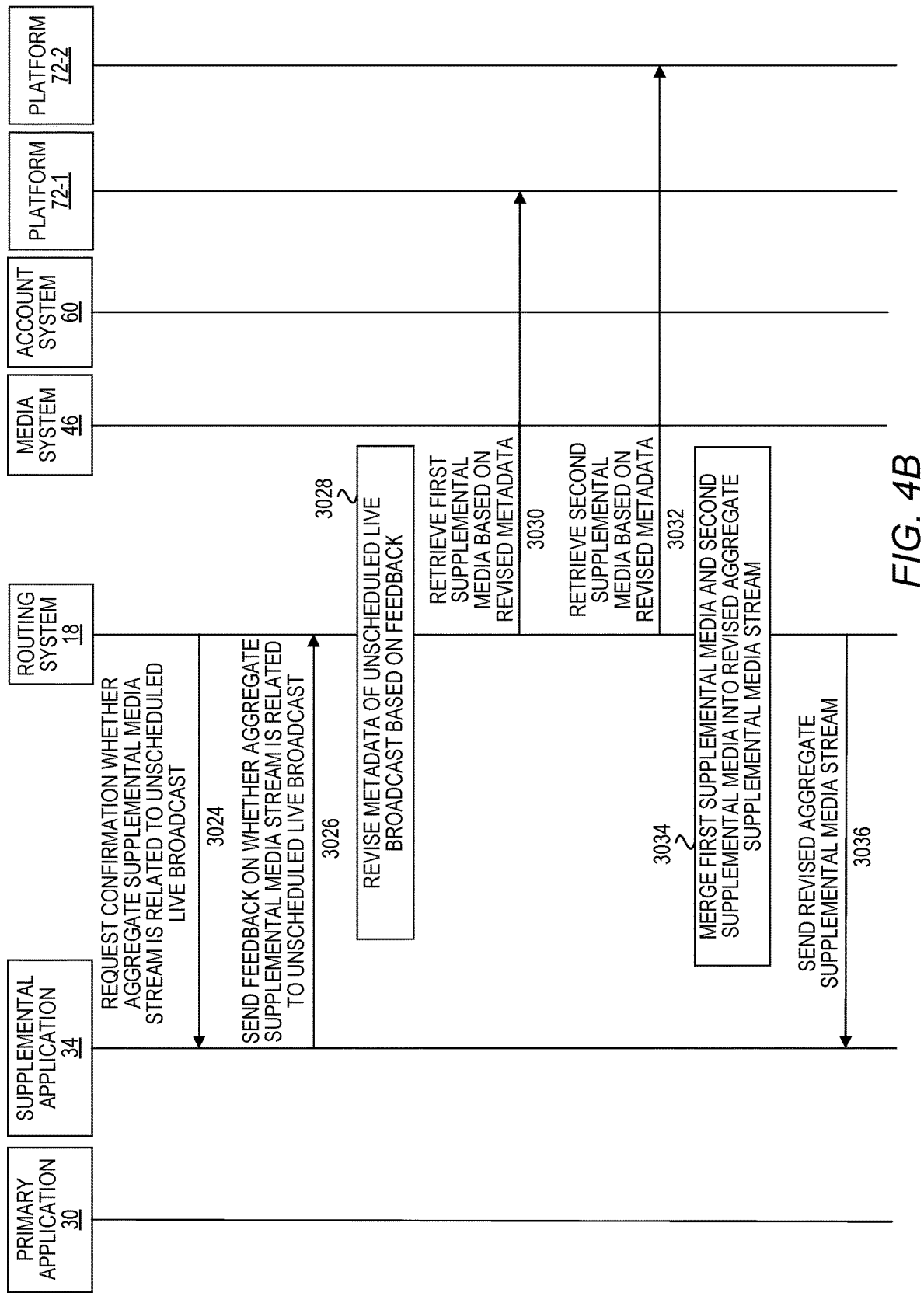
FIG. 4B is a message sequence diagram illustrating example messages communicated between and actions taken by several of the elements illustrated in FIGS. 1A-1C regarding sending a revised aggregate supplemental media stream for the unscheduled live broadcast, according to one embodiment.

FIG. 4B is a message sequence diagram illustrating example messages communicated between and actions taken by several of the elements illustrated in FIGS. 1A-1C regarding sending a revised aggregate supplemental media stream for an unscheduled live broadcast, according to one embodiment. The routing system 18 requests confirmation from the supplemental application 34 as to whether the aggregate supplemental medial stream 35 is related to the unscheduled live broadcast (3024). The supplemental application 34 then sends feedback 98 on whether the aggregate supplemental media stream 35 is related to the unscheduled live broadcast (3026). The routing system 18 revises the metadata 48 of the unscheduled live broadcast based on the feedback 98. The routing system 18 then retrieves first supplemental media 36 based on the revised metadata 48 from the first platform 72-1 (3030) and retrieves second supplemental media 36 based on the revised metadata 48 from the second platform 72-2 (3032). The routing system 18 merges the first supplemental media 36 and the second supplemental media 36 into a revised aggregate supplemental media stream 35 (3034). The routing system 18 then sends the revised aggregate supplemental media stream 35 to the supplemental application 34 (3036).

Figure 5A:
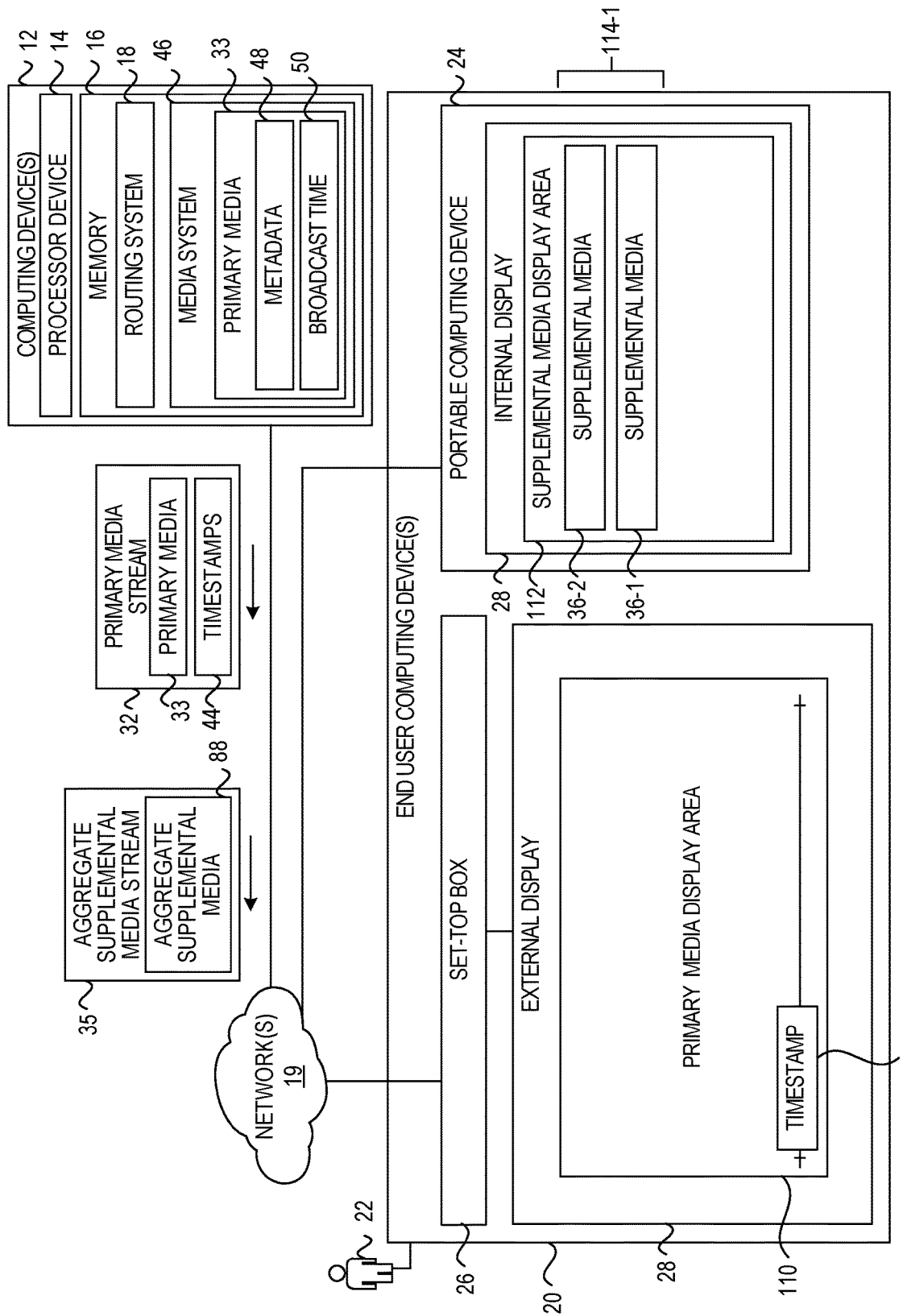
FIG. 5A is a block diagram of a system for coordinating a primary media stream with an aggregate supplemental media stream using a set-top box and portable computing device at a first time, illustrating certain aspects of various embodiments disclosed herein.

FIG. 5A is a block diagram of a system for coordinating a primary media stream with an aggregate supplemental media stream using a set-top box and portable computing device at a first time, illustrating certain aspects of various embodiments disclosed herein. At a first time, the routing system 18 sends a primary media stream 32 to the set-top box 26, which displays the primary media stream 32 within a primary media display area 110. The user 22 watches the primary media stream 32 at a first time, which may be in real-time or identified with a first timestamp 44-1. Meanwhile, in synchronization, the routing system 18 further sends an aggregate supplemental media stream 35 to the portable computing device 24. The aggregate supplemental media stream 35 includes a first group 114-1 of supplemental media 36-1, 36-2 within a supplemental media display area 112 of the end user computing device 20 of the portable computing device 24. Accordingly, the routing system 18 sends supplemental media 36-1, 36-2 from one or more platforms 72 at a first time of the primary media stream 32. This synchronizes across two separate hardware devices.

Figure 5B:
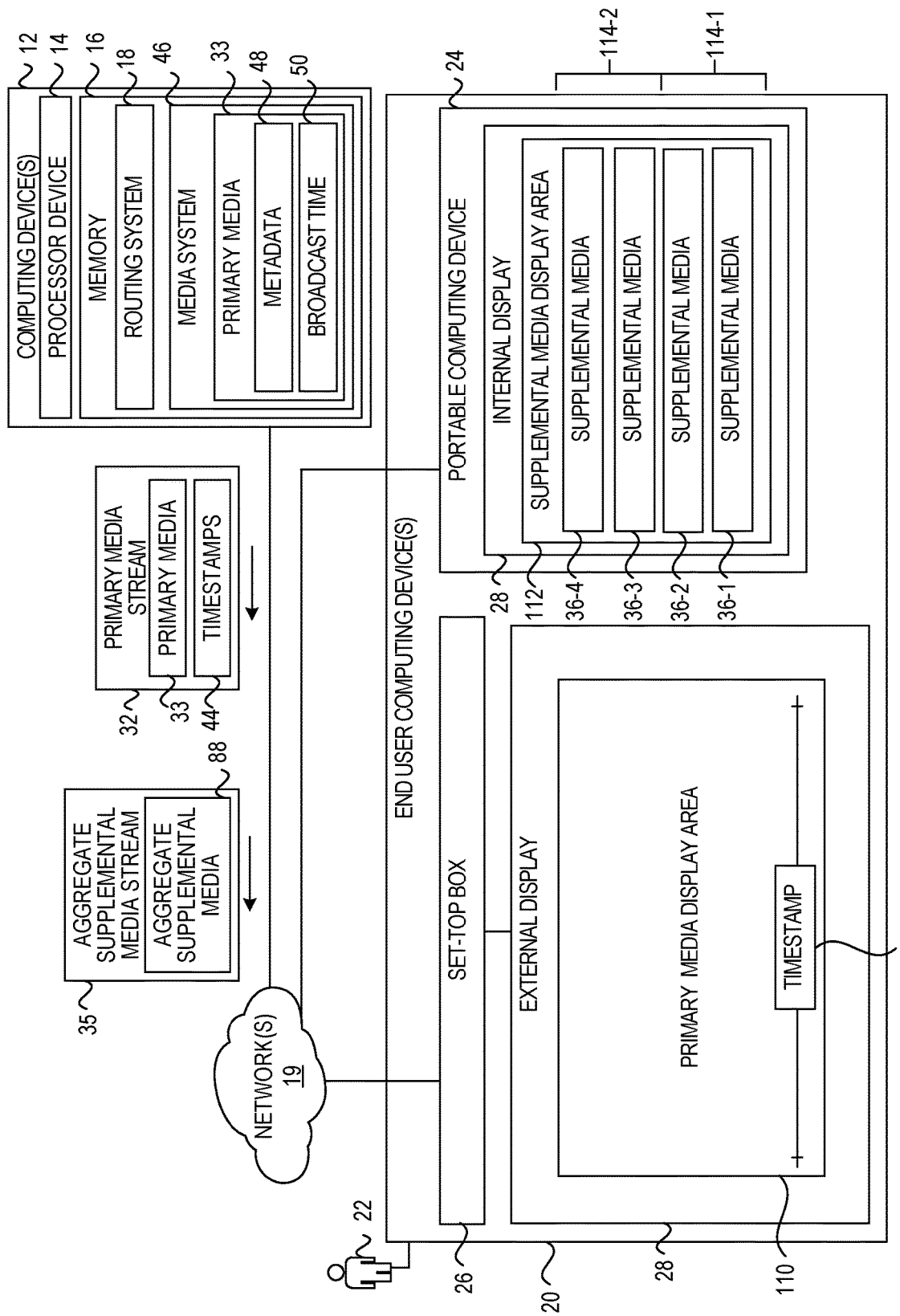
FIG. 5B is a block diagram of a system for coordinating a primary media stream with an aggregate supplemental media stream using a set-top box and portable computing device at a second time, illustrating certain aspects of various embodiments disclosed herein.

FIG. 5B is a block diagram of a system for coordinating a primary media stream with an aggregate supplemental media stream using a set-top box and portable computing device at a second time, illustrating certain aspects of various embodiments disclosed herein. At a second time, the routing system 18 sends a primary media stream 32 to the set-top box 26, which displays the primary media stream 32 within a primary media display area 110. The user 22 watches the primary media stream 32 at a second time, which may be in real-time or identified with a second timestamp 44-2. Meanwhile, in synchronization, the aggregate supplemental media stream 35 is updated to include a second group 114-2 of supplemental media 36-3, 36-4 within a supplemental media display area of the end user computing device 20 of the portable computing device 24. Accordingly, the routing system sends supplemental media 36-3, 36-4 from one or more platforms 72 at a second time of the primary media stream 32. This synchronizes across two separate hardware devices.

In certain embodiments, the end user computing device 20 includes a plurality of end user computing devices 20 including a set-top box 26 and a portable computing device 24, such as a mobile device, head-mounted display, augmented reality device, or the like. The set-top box 26 is in communication with an external display 28, such as a television. The computing device 12 is configured to determine that a primary media stream 32 is being transmitted to the end user computing device 20 of the user 22. The computing device 12 is further configured to retrieve the metadata 48 and the broadcast time 50 associated with the primary media stream 32 transmitted to the set-top box 26 of the user 22. The computing device 12 is further configured to send to the portable computing device 24 of the user 22, the aggregate supplemental media stream 35 in synchronization with the primary media stream 32.

In certain embodiments, the end user computing device 20 includes a plurality of end user computing devices 20, including a television and an augmented reality device. The computing device 12 is further configured to send to the augmented reality device of the user 22, the aggregate supplemental media stream 35 in synchronization with the primary media stream 32.

Figure 6:
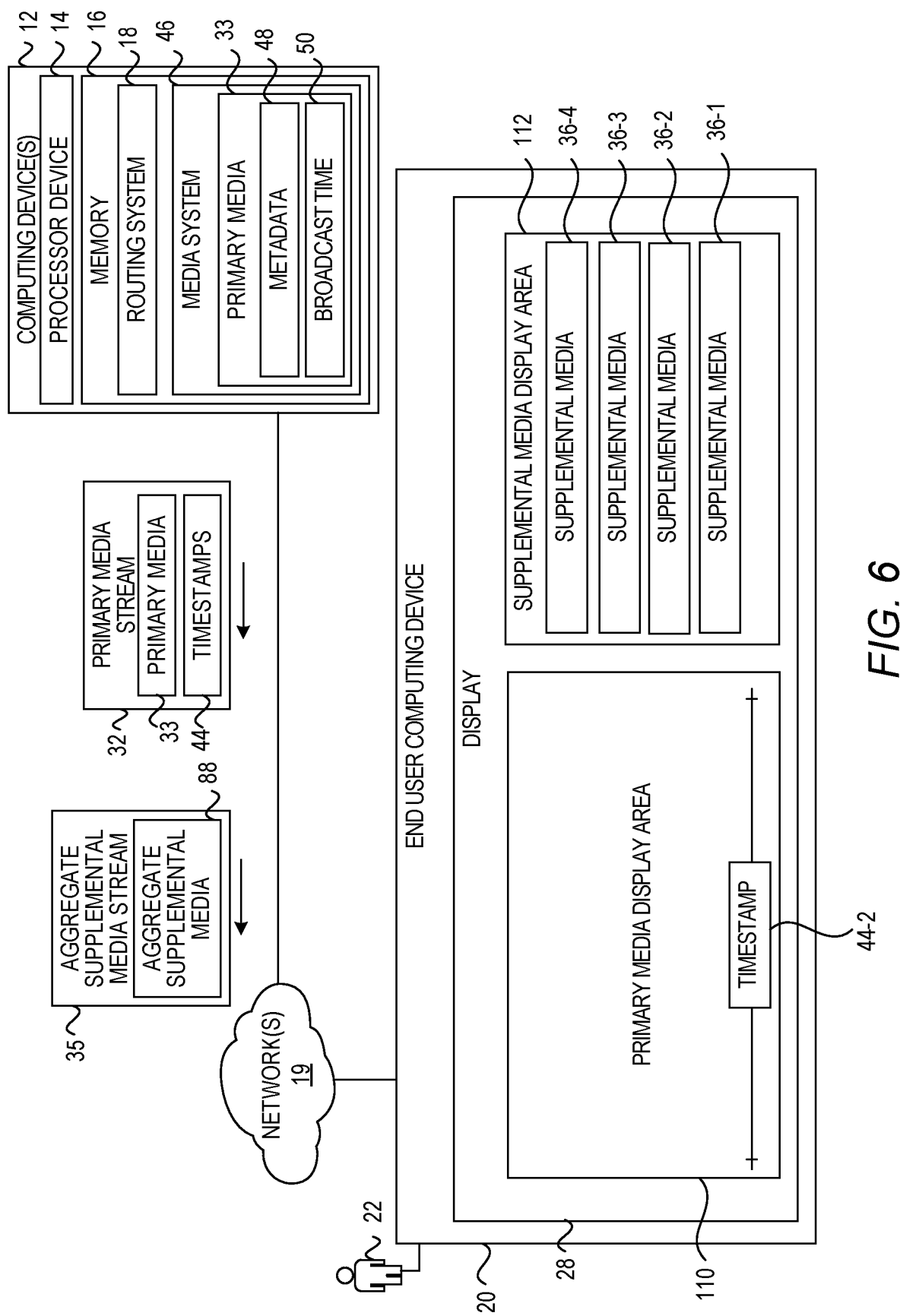
FIG. 6 is a block diagram of a system for coordinating a primary media stream with an aggregate supplemental media stream using a single end user device with a primary media display area adjacent to a supplemental media display area, illustrating certain aspects of various embodiments disclosed herein.

FIG. 6 is a block diagram of a system for coordinating a primary media stream with an aggregate supplemental media stream using a single end user computing device with a primary media display area next to a supplemental media display area, illustrating certain aspects of various embodiments disclosed herein. In this embodiment, a single end user computing device 20 includes a display 28 with a primary media display area 110 and a supplemental media display area 112 adjacent to the primary media display area 110. In this embodiment, the primary media display area 110 and the supplemental media display area 112 are non-overlapping.

Figure 7:
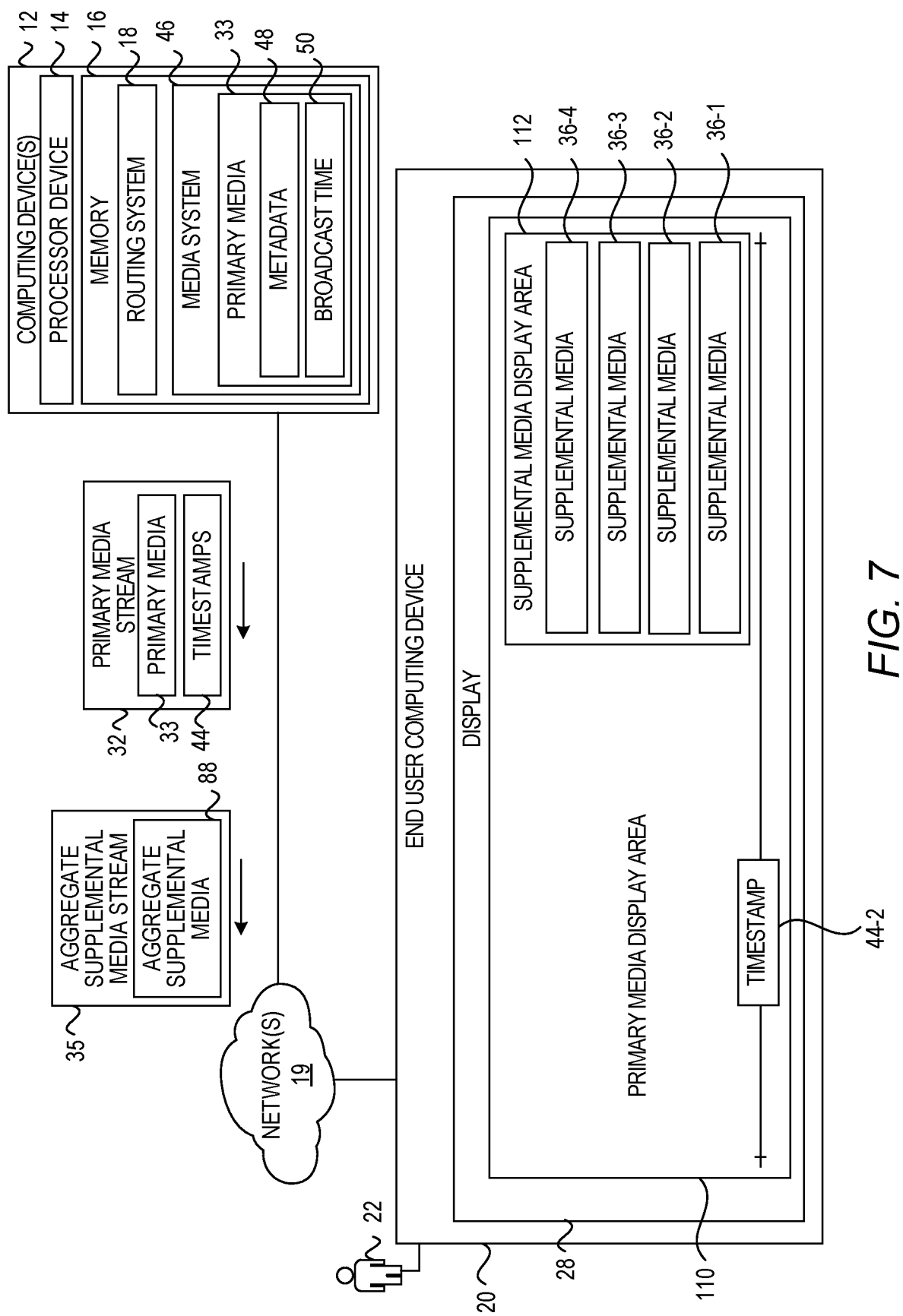
FIG. 7 is a block diagram of a system for coordinating a primary media stream with an aggregate supplemental media stream using a single end user device with a primary media display area overlapping with a supplemental media display area, illustrating certain aspects of various embodiments disclosed herein.

FIG. 7 is a block diagram of a system for coordinating a primary media stream with an aggregate supplemental media stream using a single end user computing device with a primary media display area overlapping with a supplemental media display area, illustrating certain aspects of various embodiments disclosed herein. In this embodiment, a single end user computing device 20 includes a display 28 with a primary media display area 110 and a supplemental media display area 112 within the primary media display area 110. In this embodiment, the primary media display area 110 and the supplemental media display area 112 are overlapping.

Figure 8:
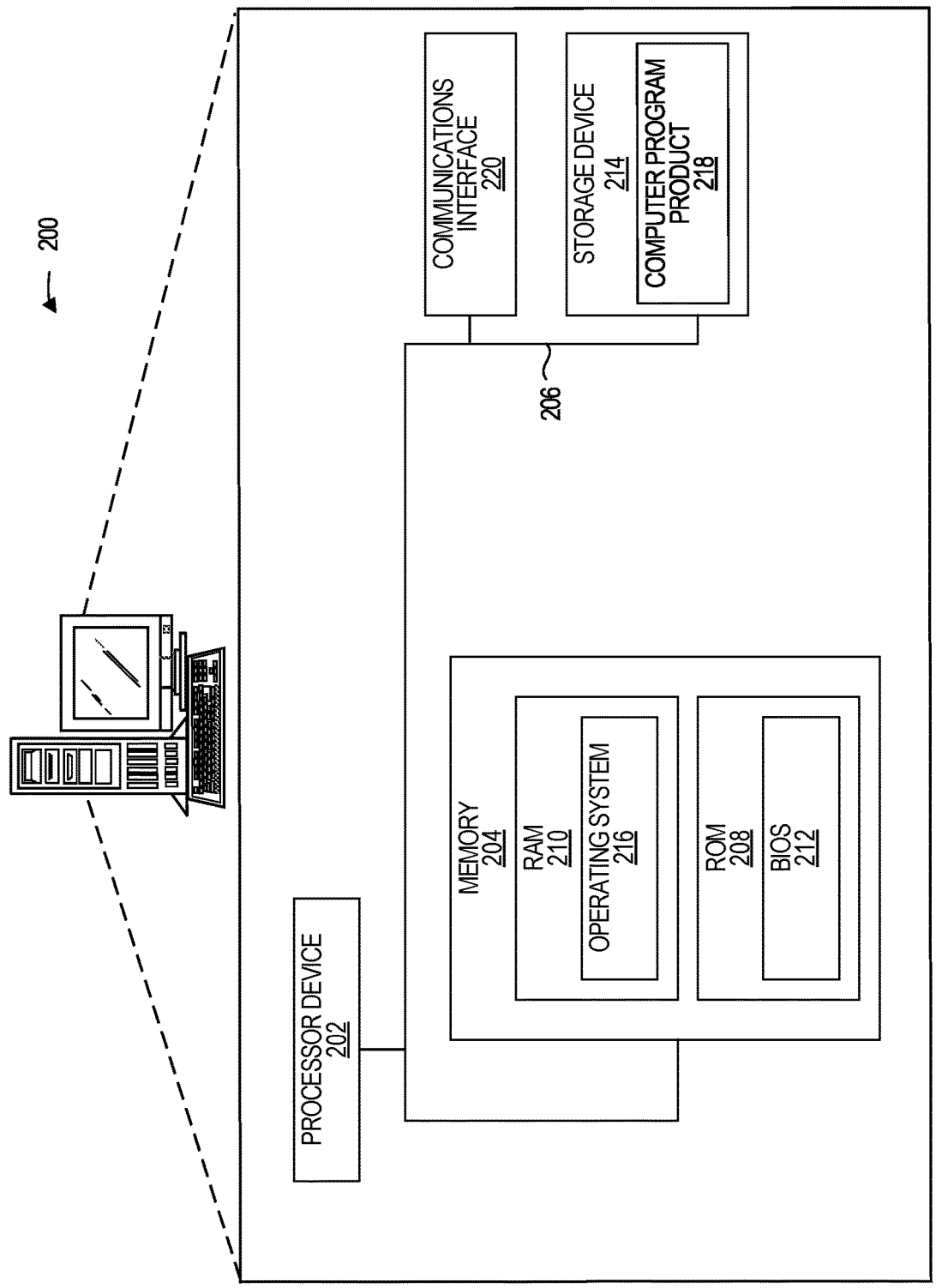
FIG. 8 is a block diagram of a computing device suitable for implementing one or more of the embodiments disclosed herein, according to one embodiment.

FIG. 8 is a block diagram of a computing device 200 containing components suitable for implementing any of the processor devices disclosed herein. The computing device 200 includes a processor device 202, a system memory 204, and a system bus 206. The system bus 206 provides an interface for system components including, but not limited to, the system memory 204 and the processor device 202. The processor device 202 can be any commercially available or proprietary processor.

The system bus 206 may be any of several types of bus structures that may further interconnect to a memory bus (with or without a memory controller), a peripheral bus, and/or a local bus using any of a variety of commercially available bus architectures. The system memory 204 may include non-volatile memory 208 (e.g., read-only memory (ROM), erasable programmable read-only memory (EPROM), electrically erasable programmable read-only memory (EEPROM), or the like.), and volatile memory 210 (e.g., random-access memory (RAM)). A basic input/output system (BIOS) 212 may be stored in the non-volatile memory 208 and can include the basic routines that help transfer information between elements within the source computing device 200. The volatile memory 210 may also include a high-speed RAM, such as static RAM, for caching data.

The computing device 200 may further include or be coupled to a non-transitory computer-readable storage medium such as a storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be stored in the storage device 214 and in the volatile memory 210, including an operating system 216 and one or more program modules, which may implement the functionality described herein in whole or in part. All or a portion of the examples may be implemented as a computer program product 218 stored on a transitory or non-transitory computer-usable or computer-readable storage medium, such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed on the processor device 202. The processor device 202, in conjunction with the network manager in the volatile memory 210, may serve as a controller or control system for the computing device 200 that is to implement the functionality described herein.

The computing device 200 may also include one or more communication interfaces 220, depending on the particular functionality of the computing device 200. The communication interfaces 220 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:
1. A method comprising:
    receiving, by a computing device comprising a processor device, a request, from an end user device associated with a user, for supplemental media;
    determining, by the computing device, based on the request, metadata and a broadcast time associated with a primary media stream transmitted to the end user device;

retrieving, by the computing device, based on the metadata and the broadcast time, supplemental media from an account of the user on a platform; and sending, by the computing device to the end user device, a supplemental media stream that includes the supplemental media in synchronization with the primary media stream.

2. The method of claim 1 wherein the end user device comprises a plurality of end user devices including a set-top box and a mobile device;

wherein the method further comprises determining, by the computing device, that the primary media stream is being transmitted to the set-top box, the set-top box in communication with a television;

wherein to determine, by the computing device, the metadata and the broadcast time associated with the primary media stream presented on the end user device of the user further comprises retrieving, by the computing device, the metadata and the broadcast time associated with the primary media stream; and wherein sending, by the computing device to the end user device, the supplemental media stream in synchronization with the primary media stream further comprises sending, by the computing device to the mobile device, the supplemental media stream in synchronization with the primary media stream.

3. The method of claim 1 wherein the end user device comprises a plurality of end user devices including a television and an augmented reality device; and wherein sending, by the computing device to the end user device, the supplemental media stream in synchronization with the primary media stream further comprises sending, by the computing device to the augmented reality device, the supplemental media stream in synchronization with the primary media stream.

4. The method of claim 1, further comprising:

receiving, by the computing device from the end user device, authentication credentials associated with the user; and wherein retrieving, by the computing device, based on the metadata and the broadcast time, the supplemental media from the account of the user on the platform further comprises:

utilizing, by the computing device, the authentication credentials to access the account of the platform to retrieve the supplemental media filtered from a feed based on filter requirements, the filter requirements including that the supplemental media be related to the metadata and restricted by the broadcast time.

5. The method of claim 1 wherein the primary media stream is a live broadcast;

wherein the broadcast time associated with the primary media stream is a live broadcast time; and wherein retrieving, by the computing device, based on the metadata and the broadcast time, the supplemental media from the account of the user on the platform comprises retrieving, by the computing device, based on the metadata and the live broadcast time, the supplemental media from the account of the user on the platform.

6. The method of claim 5 wherein the live broadcast is a scheduled live broadcast; and further comprising receiving the metadata associated with the scheduled live broadcast before the scheduled live broadcast.

7. The method of claim 5 wherein the live broadcast is an unscheduled live broadcast; and further comprising querying the platform for trending content to generate the metadata associated with the unscheduled live broadcast.

8. The method of claim 7 further comprising sending a request to the end user device for the user to confirm whether the supplemental media is related to the unscheduled live broadcast.

9. The method of claim 8 further comprising:

receiving, by the computing device from the end user device, a user input; and revising, by the computing device, the metadata of the unscheduled live broadcast based on the user input.

10. The method of claim 1, wherein the primary media stream is a historical broadcast;

wherein the broadcast time associated with the primary media stream is a historical broadcast time; and wherein retrieving, by the computing device, based on the metadata and the broadcast time, the supplemental media from the account of the user on the platform further comprises retrieving, by the computing device, based on the metadata and the historical broadcast time, the supplemental media from the account of the user on the platform.

11. The method of claim 10 wherein sending, by the computing device, to the end user device, the supplemental media stream in synchronization with the primary media stream further comprises sending, by the computing device, to the end user device, the supplemental media stream in synchronization with the historical broadcast based on timestamps in the primary media stream.

12. The method of claim 11 wherein retrieving, by the computing device, based on the metadata and the historical broadcast time, the supplemental media from the account of the user on the platform further comprises retrieving, by the computing device, based on the metadata and the historical broadcast time, the supplemental media from the account in a batch volume; and wherein sending, by the computing device, to the end user device, the supplemental media stream in synchronization with the primary media stream further comprises sending, by the computing device, to the end user device, the supplemental media stream incrementally in streaming volumes in synchronization with the historical broadcast, each streaming volume being less than the batch volume.

13. The method of claim 1 wherein the platform comprises at least one of a social media platform, a chat platform, or a news platform.

14. A computing system comprising:

a memory; and a processor device set comprising one or more processor devices coupled to the memory to:

receive a request, from an end user device associated with a user, for supplemental media;

determine, based on the request, metadata and a broadcast time associated with a primary media stream transmitted to the end user device;

retrieve, based on the metadata and the broadcast time, supplemental media from an account of the user on a platform; and send, to the end user device, a supplemental media stream that includes the supplemental media in synchronization with the primary media stream.

15. The computing system of claim 14 wherein the end user device comprises a plurality of end user devices including a set-top box and a mobile device, and wherein the processor device set is further configured to determine that the primary media stream is being transmitted to the set-top box;

wherein, to determine the metadata and the broadcast time associated with the primary media stream presented on the end user device, the processor device set is further configured to retrieve the metadata and the broadcast time associated with the primary media stream transmitted to the set-top box; and wherein to send, to the end user device, the supplemental media stream in synchronization with the primary media stream, the processor device set is further configured to send to the mobile device, the supplemental media stream in synchronization with the primary media stream.

16. The computing system of claim 14 wherein the processor device set is further configured to:

receive from the end user device, authentication credentials associated with the user; and wherein to retrieve, based on the metadata and the broadcast time, the supplemental media from the account of the user on the platform, the processor device set is further configured to:

utilize the authentication credentials to access the account of the platform to retrieve the supplemental media filtered from a feed based on filter requirements, the filter requirements including that the supplemental media be related to the metadata and restricted by the broadcast time.

17. The computing system of claim 14 wherein the platform comprises at least one of a social media platform, a chat platform, or a news platform.

18. A computer program product stored on a non-transitory computer-readable storage medium and including instructions to cause a processor device set comprising one or more processor devices to:

receive a request, from an end user device associated with a user, for supplemental media;

determine, based on the request, metadata and a broadcast time associated with a primary media stream transmitted to the end user device;

retrieve, based on the metadata and the broadcast time, supplemental media from an account of the user on a platform; and send, to the end user device, a supplemental media stream that includes the supplemental media in synchronization with the primary media stream.

19. The computer program product of claim 18 wherein the end user device comprises a plurality of end user devices including a set-top box and a mobile device, and wherein the instructions further cause the processor device set to determine that the primary media stream is being transmitted to the set-top box;

wherein, to determine the metadata and the broadcast time associated with the primary media stream presented on the end user device, the instructions further cause the processor device set to retrieve the metadata and the broadcast time associated with the primary media stream transmitted to the set-top box; and wherein to send, to the end user device, the supplemental media stream in synchronization with the primary media stream, the instructions further cause the processor device set to send to the mobile device, the supplemental media stream in synchronization with the primary media stream.

20. The computer program product of claim 18 wherein the instructions further cause the processor device set to:

receive from the end user device, authentication credentials associated with the user; and wherein to retrieve, based on the metadata and the broadcast time, the supplemental media from the account of the user on the platform, the instructions further cause the processor device set to:

utilize the authentication credentials to access the account of the platform to retrieve the supplemental media filtered from a feed based on filter requirements, the filter requirements including that the supplemental media be related to the metadata and restricted by the broadcast time.

\* \* \* \* \*